Patented July 23, 1929.

1,721,868

UNITED STATES PATENT OFFICE.

MAX MAYER, OF KARLSBAD, CZECHOSLOVAKIA.

PROCESS FOR THE SEPARATION OF PHOSPHORUS FROM PHOSPHORUS VAPORS.

No Drawing. Application filed October 20, 1925, Serial No. 63,797, and in Germany October 25, 1924.

In the usual processes for the manufacture of phosphorus the separation of the phosphorus from the phosphorus vapors formed presents great difficulty. The particles of phosphorus, which are mainly present in the form of mist, offer such great resistance to separation under water that it is necessary to carry out the condensation in complicated apparatus which are filled with a gas free from oxygen.

It has now been found that the separation of the particles of phosphorus mist can be effected in a relatively simple manner, in comparison with the costly and complicated process hitherto employed, if the phosphorus vapor be subjected one or more times to electro-static influence, preferably, after having been brought into intimate contact with a suitable liquid, for example, water.

In carrying out the invention, the hot phosphorus vapors are conducted to a suitable washing apparatus through which they flow in the opposite direction to that of the liquid flowing or trickling through the apparatus and from which they emerge cooled at the other end while the liquid passing through the washing apparatus becomes heated thereby. The vapor which rises from the liquid, since it becomes condensed in the cooled zone, surrounds the particles of mist as a liquid shell or envelope, enlarges them and thus enables them to be separated more easily.

By this preliminary treatment of the phosphorus vapors the result is obtained that the particles of phosphorus mist are quickly and completely separated even by a single passage through an electro-static separating apparatus.

Example.

The gases from the main phosphorus condensing plant which contain the difficultly separable phosphorus mist are led into the bottom of a fire-clay tower which is filled with pebbles, sprinkled with water and maintained at a temperature above 45° C. The gases then flow into a second tower containing the apparatus necessary for the electro-static separation of the particles of phosphorus mist which have been enlarged in the first tower. The electro-static apparatus may be of a type known per se, thus a number of extended wires or nets, which are connected alternately with the positive and negative pole of a suitable high tension plant or circuit may be employed for the separation.

I claim:—

1. The process for the separation of phosphorus from phosphorus-containing vapors which consists in subjecting the vapors after cooling to electro-static influence.

2. The process for the separation of phosphorus from phosphorus-containing vapors which consists in bringing the vapors into intimate contact with liquid and then subjecting them to electro-static influence.

3. The process for the separation of phosphorus from phosphorus-containing vapors which consists in bringing the vapors into intimate contact with water and then subjecting them to electro-static influence.

4. The process for the separation of phosphorus from phosphorus-containing vapors which consists in bringing the vapors into intimate contact with liquid of a temperature lower than that of the vapor and then passing them through an electro-static separator.

5. The process for the separation of phosphorus from phosphorus-containing vapors which consists in bringing the vapors into intimate contact with water of a temperature lower than that of the vapor and then passing them through an electro-static separator.

6. The process for the separation of phosphorus from phosphorus-containing vapors which consists in passing the vapors through a tower through which liquid passes in the opposite direction to the flow of the vapors and then passing them through an electro-static separator.

7. The process for the separation of phosphorus from phosphorus-containing vapors which consists in passing the vapors through a tower through which water passes in the opposite direction to the flow of the water and then passing them through an electro-static separator.

MAX MAYER.